US005081834A

United States Patent [19]

Darragh

[11] Patent Number: 5,081,834

[45] Date of Patent: Jan. 21, 1992

[54] CIRCULAR HEAT EXCHANGER HAVING UNIFORM CROSS-SECTIONAL AREA THROUGHOUT THE PASSAGES THEREIN

[75] Inventor: Charles T. Darragh, San Diego, Calif.

[73] Assignee: Solar Turbines Incorporated, San Diego, Calif.

[21] Appl. No.: 530,957

[22] Filed: May 29, 1990

[51] Int. Cl.[5] .............................................. F02C 7/10

[52] U.S. Cl. ................................ 60/39.511; 165/125; 165/166

[58] Field of Search .............................. 165/125, 166; 60/39.511

[56] References Cited

U.S. PATENT DOCUMENTS

| | | | |
|---|---|---|---|
| 2,429,508 | 10/1947 | Belaieff | 165/125 X |
| 2,792,200 | 5/1957 | Huggins | 165/149 |
| 3,033,534 | 5/1962 | Caughill et al. | 257/235 |
| 3,224,502 | 12/1965 | Wallace et al. | 165/82 |
| 3,255,818 | 6/1966 | Beam, Jr. et al. | 165/166 |
| 3,285,326 | 11/1966 | Wosika | 165/4 |
| 3,507,115 | 4/1970 | Wosika | 60/39.51 |
| 3,759,323 | 9/1973 | Dawson et al. | 165/166 |
| 3,818,984 | 6/1974 | Nakamura et al. | 165/166 |
| 3,831,374 | 8/1974 | Nicita | 165/166 X |
| 4,031,953 | 6/1977 | Kline | 165/66 |
| 4,098,330 | 7/1978 | Flower et al. | 165/166 |
| 4,506,502 | 3/1985 | Shapiro | 60/39.43 |

FOREIGN PATENT DOCUMENTS

| | | | |
|---|---|---|---|
| 0077656 | 4/1983 | European Pat. Off. . | |
| 61-86596 | 5/1986 | Japan | 165/166 |
| WO82/02940 | 9/1982 | PCT Int'l Appl. . | |
| 460831 | 10/1968 | Sweden . | |
| 892962 | 4/1962 | United Kingdom . | |
| 2217828 | 11/1989 | United Kingdom . | |

*Primary Examiner*—Allen J. Flanigan

*Attorney, Agent, or Firm*—Larry G. Cain

[57] ABSTRACT

Circular heat exchangers have been used to increase the efficiency of engines by absorbing heat from the exhaust gas and transferring a portion of the exhaust heat to the intake air. The present heat exchanger is built to be more efficient, to better resist the internal forces and pressures and to better withstand the thermal stress from the cyclic operation of the engine. The core has a plurality of heat recipient passages therein which have a uniform cross-sectional area throughout the entire length of the passage. And the core further has a plurality of heat donor passages therein which have a uniform cross-sectional area throughout the entire length of the passage.

14 Claims, 5 Drawing Sheets

CIRCULAR HEAT EXCHANGER HAVING UNIFORM CROSS-SECTIONAL AREA THROUGHOUT THE PASSAGES THEREIN

DESCRIPTION

1. Technical Field

This invention relates generally to a heat exchanger and more particularly to the construction of a heat exchanger having a circular configuration, a plurality of passages therein and each of the passages having a uniform cross-sectional area throughout the entire length of the passage.

2. Background Art

Many gas turbine engines use a heat exchanger or recuperator to increase the operation efficiency of the engine by extracting heat from the exhaust gas and preheating the intake air. Typically, a recuperator for a gas turbine engine must be capable of operating at temperatures of between about 500° C. and 700° C. internal pressures of between approximately 450 kPa and 1400 kPa under operating conditions involving repeated starting and stopping cycles.

Such circular recuperators include a core which is commonly constructed of a plurality of relatively thin flat sheets having an angled or corrugated spacer fixedly attached therebetween. The sheets are joined into cells and sealed at opposite sides and form passages therebetween the sheets. These cells are stacked or rolled and form alternative air cells and hot exhaust cells. Compressed discharged air from a compressor of the engine passes through the air cells while hot exhaust gas flows through alternate cells. The exhaust gas heats the sheets and the spacers, and the compressor discharged air is heated by conduction from the sheets and spacers.

An example of such a recuperator is disclosed in U.S. Pat. No. 3,285,326 issued to L. R. Wosika on Nov. 15, 1966. In such a system, the recuperator includes a pair of relatively thin flat plates spaced from an axis and wound about the axis with a corrugated spacer therebetween. The air flow enters one end and exits the opposite end and the exhaust flow is counter-flow to the air flow entering and exiting at the respective opposite ends. One of the problems with such a system is its lack of efficiency and the inability to inspect or check each passage for leakage prior to final assembly. Furthermore, the outer plate is exposed to the recuperator temperatures on one side and to the environmental temperature on the other side. Thus, as the recuperator expands and contracts due to start up and shut down, the thermal stress and strain induced in the core at the point of connection between the core and the plate will be greatly varied and reduce the longevity of the structure.

Another example of such a recuperator is disclosed in U.S. Pat. No. 3,507,115 issued to L. R. Wosika on Jul 28, 1967. In such a system, the recuperator comprises a hollow cylindrical inner shell and a concentric outer shell separated by a convoluted separator sheet which is wound over and around several corrugated sheets forming a series of corrugated air cores and combustion gas cores. In order to increase the transfer between the hot gases or cold air, the corrugated sheets are metallically bonded to the separator sheets in an attempt to increase efficiency. One of the problems with such a system is its lack of efficiency and the ability to test or inspect individual passages prior to assembly into a finished heat exchanger. Furthermore, the concentric outer shell is exposed to the recuperator temperatures on one side and to the environmental temperature on the other side. Thus, as the recuperator expands and contracts due to start up and shut down, the thermal stress and strain induced in the core at the point of connection between the convoluted separator sheets, the corrugated sheets and the concentric outer shell will be greatly varied and reduce the longevity of the structure.

Another example of such a recuperator is disclosed in U.S. Pat. No. 3,255,818 issued to Paul E. Beam, Jr et al, on Jun. 14, 1966. In such a system, a simple plate construction includes an inner cylindrical casing and an outer annular casing having a common axis. Radially disposed plates form passages A and B which alternately flow a cooler fluid and a hotter fluid therethrough. A corrugated plate being progressively narrower in width toward the heat exchanger axis is positioned in the passage A, and a corrugated plate being progressively larger in width toward the axis is positioned in the passage B. One of the problems with such a system is its lack of efficiency. Furthermore, the outer annular casing is exposed to the recuperator temperatures on one side and to the environmental temperature on the other side. Thus, as the recuperator expands and contracts due to start up and shut down, the thermal stress and strain induced in the core at the point of connection between the radially disposed plates and the outer casing will be greatly varied and reduce the longevity of the structure.

Another example of a circular recuperator or regenerator is disclosed in U.S. Pat. No. 3,476,174 issued to R. W. Guernsey et al, on Nov. 4, 1969. In such system, a radial flow regenerator includes a plurality of heat transfer segments formed by a number of laid-up thin corrugated sheet metal strips or shims. The segments are mounted between stiffeners, and a bridge is positioned in notches and secured to the segments. Thus, the regenerator, while providing a radial flow, fails to efficiently make use of the entire heat exchange area. For example, the stiffeners and bridges are positioned in an area which could be used for heat transferring purposes. Furthermore, the cost and complexity of the structure is greatly increased because of the notches and complex shapes of the control beams.

Another example of a heat exchanger construction is disclosed in U.S. Pat. No. 3,759,323 issued to Harry J. Dawson et al, on Sept. 18, 1973. A primary surface plate-type heat exchanger construction is shown and uses a plurality of successive stacked flat sheets having a plurality of edge bars for spacing the sheets apart. A large number of sheets are stacked in pairs with the edge bars therebetween to form a heat exchange core of a desired size.

Another example of a heat exchanger construction is disclosed in U.S. Pat. No. 4,098,330 issued to Robert J. Flower et al, on Jul. 23, 1976. Annular configuration is formed by stacking a plurality of corrugated individual plates one against another to progressively form the heat exchanger. The plates are involutely curved with the axis of the corrugations normal to the involute configuration. The stacking of the plates form constant height fluid passages therebetween. The heat exchanger while using involutely curved plates fails to provide an economical heat exchanger. Furthermore, the cost and complexity of the individual components making up the structure and the assembling of the components greatly increases the cost.

The present invention is directed to overcome one or more of the problems as set forth above.

DISCLOSURE OF THE INVENTION

In one aspect of the invention, a heat exchanger includes a core having a heat recipient passage and a heat donor passage therein. The heat recipient passage has a recipient fluid therein during operation and the heat donor passage has a donor fluid therein during operation. The core includes a plurality of stacked primary surface cells each defining one of the passages therein. The cells are secured together forming a generally circular core and adjacent cells form the other of the passages therebetween. Each of the plurality of cells have an involute curved shape and include at least a pair of primary surface pleated sheets. Each of said heat recipient passages having a uniform cross-sectional area throughout the entire length of the passage. And each of the donor passages have a uniform cross-sectional area throughout the entire length of the passage.

In another aspect of the invention, a gas turbine engine includes an exhaust system having a donor fluid as a part thereof, an air intake system having a recipient fluid as a part thereof, a heat exchanger including a core having a heat recipient passage and a heat donor passage therein and a housing surrounding the core. The core includes a plurality of stacked primary surface cells each defining one of the passages therein. The cells are secured together forming a generally circular core and the adjacent cells form the other of the passages therebetween. Each of the plurality of cells have an involute curved shape and include at least a pair of primary surface pleated sheets. Each of the heat recipient passages have a uniform cross-sectional area throughout the entire length of the passage and each of the heat donor passages have a uniform cross-sectional area throughout the entire length of the passages.

BEST MODE FOR CARRYING OUT THE INVENTION

Figure 1:
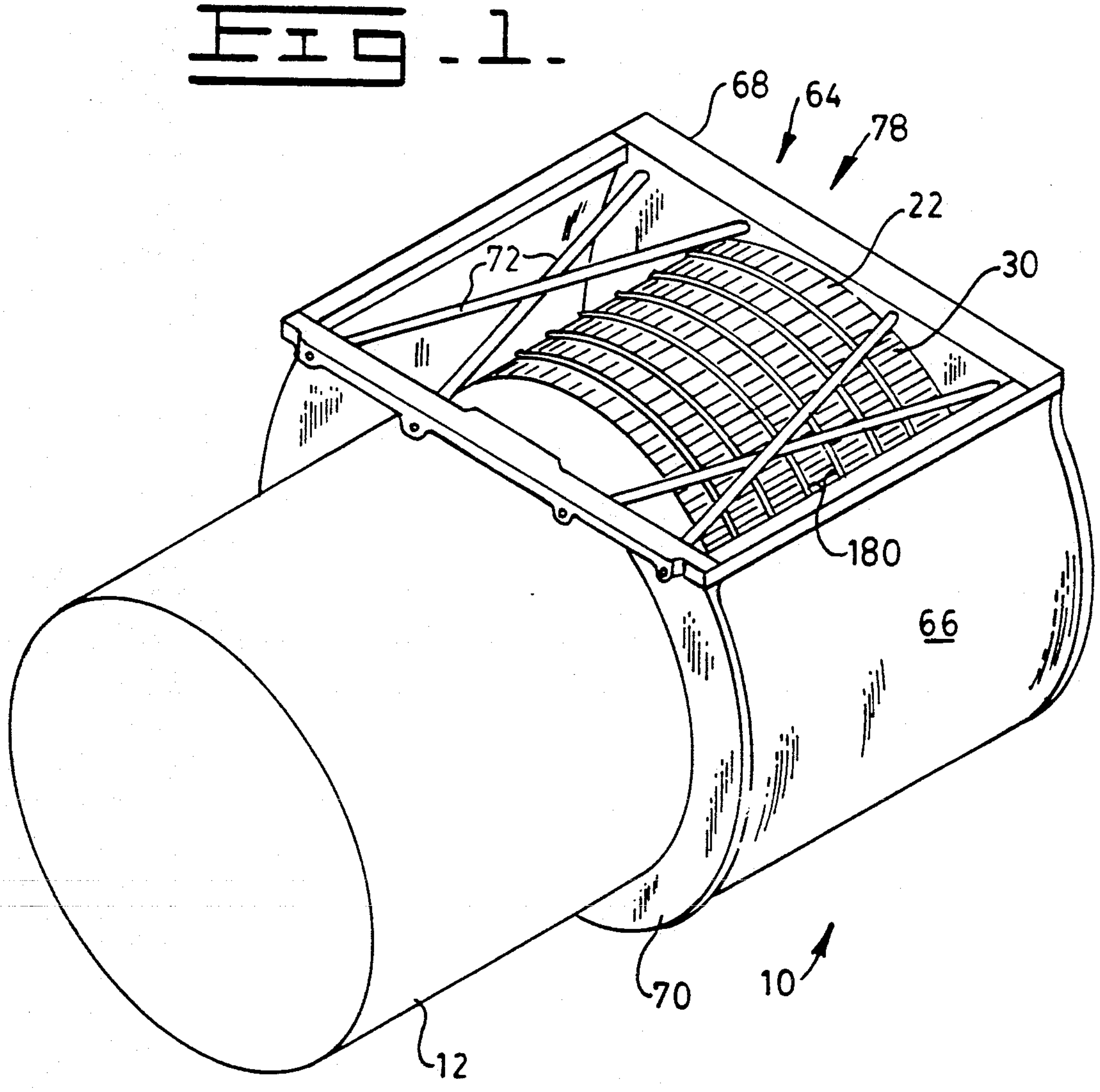
FIG. 1 is a perspective view of a portion of an engine adapter for use with an embodiment of the present invention.
Figure 2:
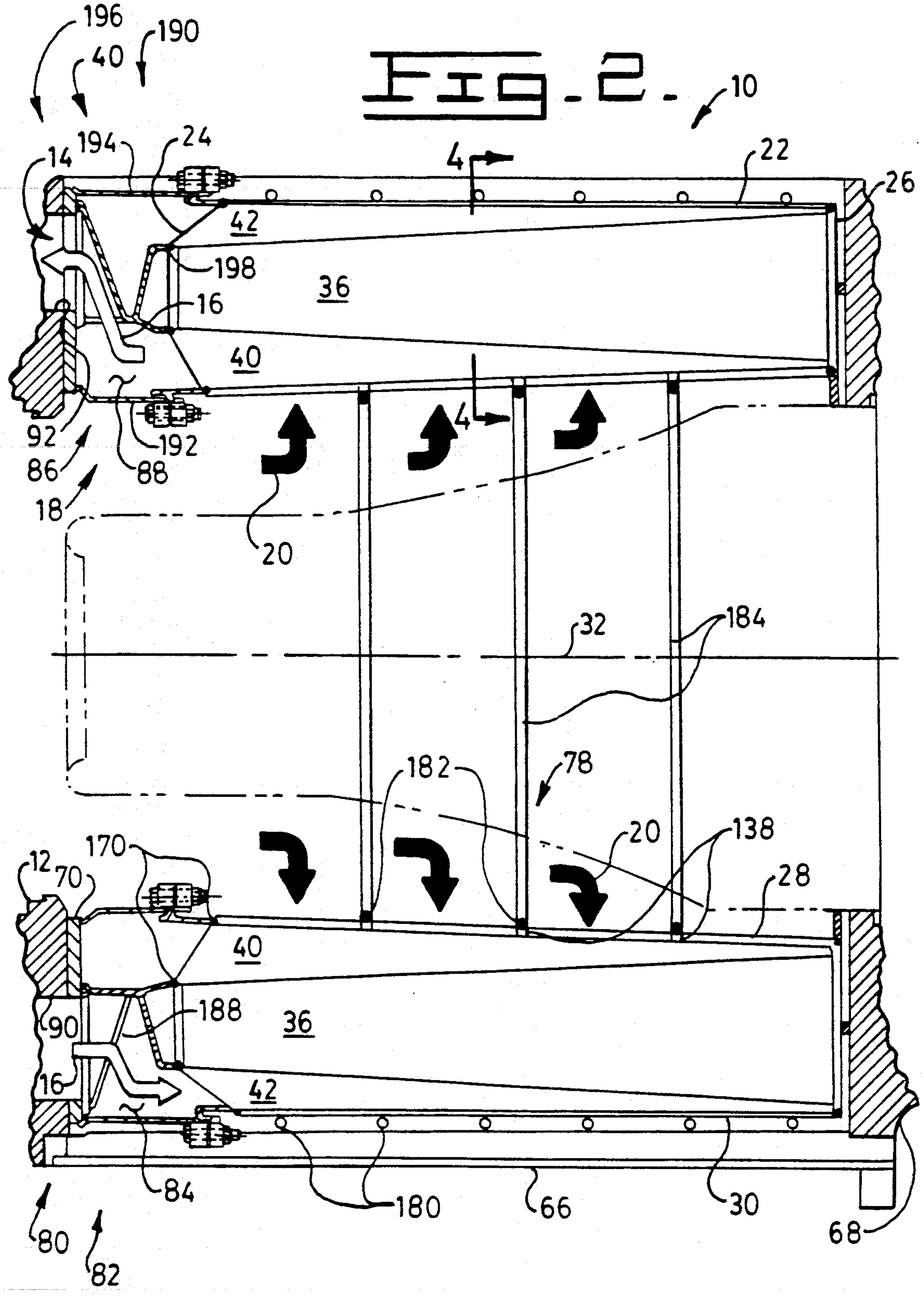
FIG. 2 is a sectional view of a heat exchanger and a portion of the engine.
Figure 3:
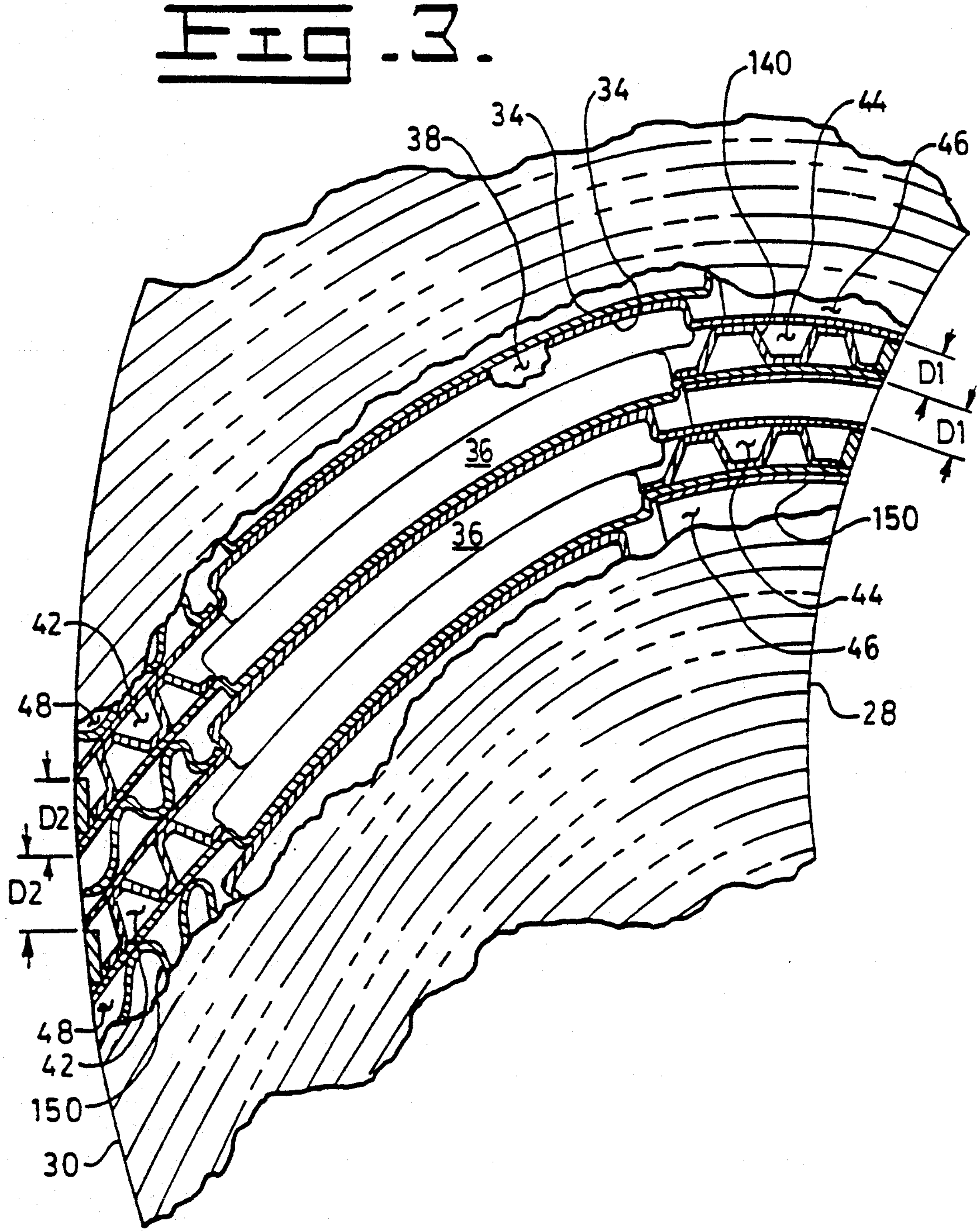
FIG. 3 is an enlarged sectional view through a plurality of cells taken along line 3—3 of FIG. 2.

Referring to the drawings, specifically FIGS. 1, 2 and 3, a heat exchanger or recuperator 10 is attached to an engine 12. The engine 12 in this application is a typical gas turbine engine including a compressor section being in fluid connection with a combustor which is further in fluid connection with a power turbine, of which are not shown, an air intake system 14, only partially shown, having a recipient fluid, designated by the arrow 16. The engine 12 further includes an exhaust system 18, only partially shown, having a donor fluid, designated by the arrow 20. The temperature range of the recipient fluid 16 is lower than the temperature range of the donor fluid 20. As an alternative, the heat exchanger 10 could be used with any device having the recipient fluid 16 and the donor fluid 20 and in which heat transfer is desirable. The heat exchanger 10 includes a generally circular shaped core 22 being made of many pieces. The core 22 has a pair of ends 24 and 26, an inner portion 28 and an outer portion 30. The core 22 is generally centered about a central axis 32 and is removably attached to the engine 12. The heat exchanger 10 could be fixedly attached to the engine 12 without changing the gist of the invention. As best shown in FIG. 3, the core 22 is made up of a plurality of primary surface cells 34, each having a first passage or a heat recipient or a heat recovery passage 36 therein. A plurality of second passages or heat donor passages 38 are formed between adjacent cells 34 of the core 22. The cells are stacked in contact with another one of the cells 34 and the cells are fixedly secured together by means 40 for securing.

An inlet passage 42 is positioned in each of the cells 34 and in fluid communication with corresponding passages 36 for the recipient fluid 16 to pass therethrough prior to entering the passages 36. An outlet passage 44 is positioned in each of the cells 34 and in fluid communication with corresponding passages 36 for the recipient fluid 16 to pass therethrough after passing through the passages 36. A plurality of inlet passages 46 are generally positioned inwardly of the heat recipient passages 36 and are in fluid communication with individual passages 38 for the donor fluid 20 to pass therethrough prior to entering the passages 38. A plurality of outlet passages 48 are generally positioned outwardly of the heat recipient passages 36 and are in fluid communication with individual passages 38 for the donor fluid 20 to pass therethrough after passing through the passage 38.

The plurality of heat recipient passages 36 each have a preestablished transverse cross-sectional area which is equal throughout the entire length of the passage 36. The plurality of heat recipient passages 42 and 44 each having a preestablished transverse cross-sectional area which is equal throughout the entire length of the passages 42 and 44. Each of the cross-sectional area of the passages 42,36,44 further includes a preestablished thickness along the entire length of the passages which is equal to each other. And the plurality of donor passages 38 each have a preestablished transverse cross-sectional area which is equal throughout the entire length of the passage 38. The plurality of inlet passages 46 and outlet passages 48 each having a preestablished transverse cross-sectional area which is equal thought the entire length of the passages 46 and 48. Each of the cross-sectional area of the passages 46,38,48 further includes a preestablished thickness along the entire length of the passages which is equal to each other. In this specific application, the uniform cross-sectional area and the preestablished thickness of each of the passages 42,44 are equal to each other and the uniform cross-sectional area and the preestablished thickness of each of the passages 46,48 are equal to each other. Furthermore in this specific application, the uniform cross-sectional area and the thickness of each passage 36 and 38 are equal to each other. The thickness of the passages is approximately 3.66 mm. As an alternative, the uniform cross-sectional area and/or thickness of each of the passages could be larger or smaller. In many instances, the area and thickness are varied depending on the characteristics of the recipient fluid 16 and the heat donor fluid 20 and the area available for heat transfer and heat recovery.

The heat exchanger 10 further includes a housing 64 which is a part of the heat exchanger 10 partially surrounding the core 22. The housing 64 includes a generally cylindrical wrapper plate 66, an end plate 68 and a mounting adapter 70 for attaching to the engine 12. As an alternative, the mounting adapter 70 or the housing 64 could be a part of the engine 12. A plurality of tie rods 72 interconnect the end plate 68 and the mounting adapter 70 adding further rigidity to the housing 64.

Figure 5:
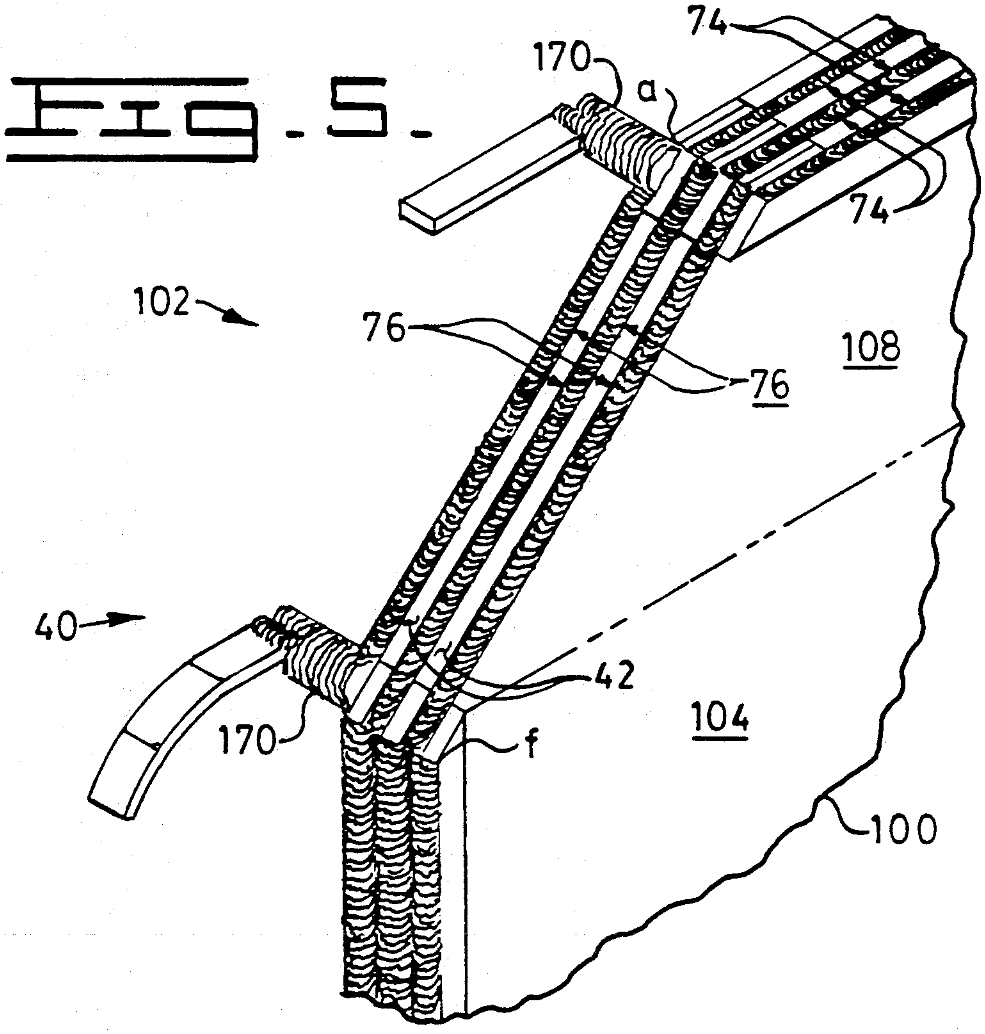
FIG. 5 is a detailed view of a portion of a core showing a portion of the weld thereon.

During operation, the donor fluid 20 passes through the inlet passages 46, heat donor passages 38 and the outlet passages 48 exerting a first working pressure or force, designated by the arrows 74 as best shown in FIG. 5. The recipient fluid 16 passes through the inlet passages 42, heat recipient passages 36 and outlet passages 44 exerting a second working pressure or force, designated by the arrows 76 as best shown in FIG. 5, in the passages 34,32,36. The first and second working pressures 74,76 have different magnitudes of pressure resulting in a combination of forces attempting to separate the cells 34. The heat exchanger 10 further includes a means 78 for resisting the forces attempting to separate the cells 34 and means 80 for sealing the donor fluid 20 and the recipient fluid 16. The means 80 insures that the donor fluid 20 passes through the core 22 and seals the recipient fluid 16 prior to entering the core and after passing through the core 22. The means 78 for resisting the forces attempting to separate the cells 34 responds to the temperature of only the hotter of the fluids 16,20 and maintains a preestablished force on the heat exchanger 10.

The heat recipient passage 36 is connected to the air intake system 14 and the heat donor passage 38 is connected to the exhaust system 18. Positioned between the engine 10 and the core 22 is means 82 for distributing the recipient fluid 16 prior to passing through the passages 42,36,44. The means 82 for distributing the recipient fluid 16 includes a generally circular reservoir 84 positioned generally radially outwardly from the heat recipient passage 36 and generally axially external from the core 22. Positioned between the engine 10 and the core 22 is means 86 for collecting the recipient fluid 16 after passing through the passages 42,36,44. The means 86 for collecting the recipient fluid 16 after passing through the passages 42,36,44 includes a generally circular reservoir 88 positioned generally radially inwardly from the heat recipient passage 36 and generally axially external from the core 22.

The gas turbine engine 12, as best shown in FIGS. 1 and 2, is of a conventional design and includes a compressor section through which clean atmospheric air, or in this application the recipient fluid 16, passes prior to entering the core 22, a power turbine section (neither of which are shown), and an exhaust system 18 through which hot exhaust gases, in this application the donor fluid 20, pass prior to entering the core 22.

The air intake system 14, as best shown in FIG. 2, of the engine 12 further includes a plurality of inlet ports 90 and outlet ports 92, of which only one each is shown, therein through which the recipient fluid 16 passes.

Figure 4:
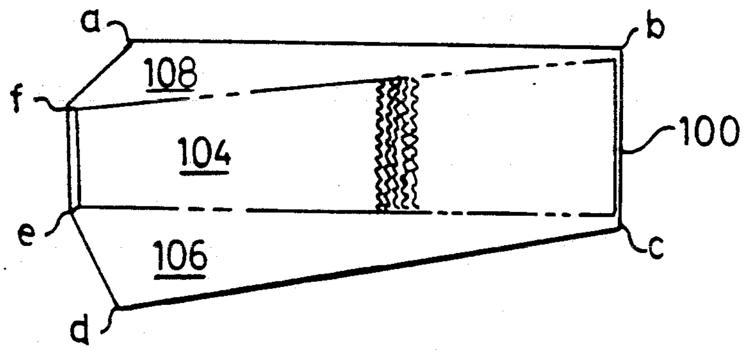
FIG. 4 is a development view of a primary surface pleated sheet showing a plurality of corners on the sheet and corresponding to the plurality of corners of the core.
Figure 6:
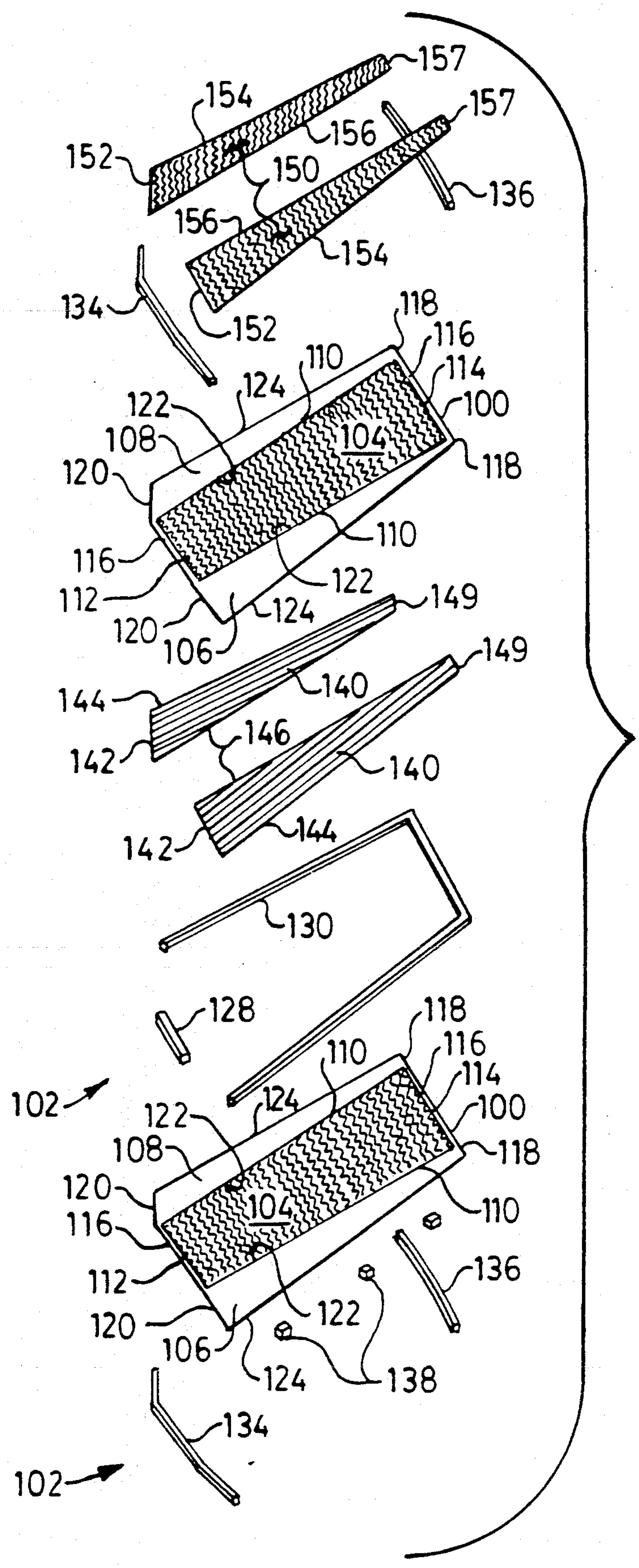
FIG. 6 is an exploded view of the components making up a cell.

As best shown in FIGS. 4, 5, and 6, the core 22 includes a plurality of individual primary surface pleated sheets 100 and means 102 for spacing the sheets 100 a preestablished distance apart. Each sheet 100 contains three principal regions. For example, a corrugated or serpentine convoluted, primary surface center portion 104 has a generally trapezoidal shape and a pair of wing portions 106 and 108 having a generally trapezoidal shape. The center portion 104 includes a pair of sides 110, a short end 112 and a long end 114 being parallel, and a pair of crimped portions 116 being in a narrow band along the short end 112 and the long end 114 and being equal in length thereto. The wing portions 106 and 108 each have a short end 118 and a long end 120, one side 122 equal in length to one of the sides 110 of the center portion 104 and a side 124 being shorter than the side 122. The spacing means 102 includes a plurality of end edge bars 128 being equal in length to the short end 112 and a plurality of generally "U" shaped edge bars 130 formed to the contour of the side 124 and the short end 118 of the wing portion 106, the long end 114 of the center portion 104, and the short end 118 and the side 124 of the wing portion 108. The spacer means 102 further includes a plurality of end bars 134 equal in length to the longer end 120 of each of the wing portions 106 and 108 and the short end 112 of the center portion 104 and a plurality of bars 136 equal in length to the short end 118 of each of the wing portions 106 and 108 and the long end 114 of the center portion 104. Further included in the spacer means 102 is a plurality of spacers 138 having a generally rectangular configuration and a preestablished thickness corresponding to the thickness of the inlet passage 46. The core 22 further includes a plurality of generally triangular members 140 having an end 142 being slightly less in length than the long end 120, a side 144 being slightly less in length than the side 124, a side 146 being slightly less in length than the side 122 and a side 149 being slightly less than the side 118 of the wing portions 106 and 108. A plurality of triangular members 150 are included in the core 22 and have an end 152 being slightly less in length than the long end 120, a side 154 being slightly less in length than the side 124, a side 156 being slightly less in length than the side 122 and a side 157 being slightly less in length than the side 118 of the wing portions 106 and 108. When the triangular members 140 are viewed through a cross-section taken perpendicular to the side 144, a generally wavy configuration is shown, as best shown in FIG. 3. The wave configuration has a height equivalent to the thickness of the heat recipient passage 36. When the triangular members 150 are viewed through a cross-section taken perpendicular to the side 154, a generally wavy configuration is shown in the outlet passages 48; however, as shown in the inlet passages 46 the generally wavy configuration is not obvious. Each of the wave configurations have a height equivalent to the thickness of the corresponding recipient passages 36 and donor passages 38. The wavy configurations for the members 140 and 150 are not identical. For example, the configuration for the member 150, as best shown in FIG. 3, has rounded crests, whereas the configuration for the member 140 has flat crests with rounded corners. As best shown in FIG. 6, each of the cells 34 is assembled as follows. One of the end bars 134 is positioned in a fixture (not shown) corresponding in position to the long end 120 of the wing portions 106 and 108 and the short end 112 of the center portion 104. One of the bars 136 is positioned in the above fixture in line with the corresponding position of the short ends 118 of the wing portions 106 and 108 and the long end 114 of the center portion 104. An individual sheet 100 is positioned in the fixture with the crimped portions 116 corresponding to the appropriate portions of the end bar 134 and the bar 136. One of the edge bars 128 is positioned with respect to the short end 112 of the center portion 104 and the "U" shaped edge bar 130 is positioned with respect to the individual sheet 100. A pair of the triangular members 140 are reciprocally positioned and fixedly attached to corresponding wing portions 106 and 108. A second sheet 100 is positioned in the fixture as described above. An end bar 134 is positioned on top of the sheet 100 corresponding in position to the long ends 120 of the wing portions 106 and 108 and the short end 112 of the center portion 104. A bar 136 is positioned in line with the corresponding position of the short ends 118 of the wing portions 106 and 108 and the long end 114 of the center portion 104. A pair of the triangular members 150 are reciprocally positioned and fixedly attached to corresponding wing portions 106 and 108. In the present application, three of the spacers 138 are evenly spaced along the side 124 of only the wing portion 106 of which will eventually be the inner portion 28 of the core 22. As an alternative, any number of the spacers 138 could be used along the side 124 provided that the flow of the donor fluid 20 is not overly restricted or blocked. As the fixture is closed, the sheets 100, the triangular members 140,150 and the spacing means 102 are bent and formed into their involute configuration. The convoluted center portion is bent so that the axis of the serpentine convolutions are generally in line with the involute configuration. Thus, the uniform cross-sectional area along the entire length of the passages 36,38 is substantially the same. The components are welded together retaining the components in the involute configuration. As an alternative, prior to assembling the cells 34, the individual sheets 100 and the spacing means 102 could be bent or formed into their appropriate involute configuration. Furthermore, the pair of sheets 100 and the spacing means 102 form the inlet portion 42, recipient passage 36 and the outlet portion 44 therebetween and the finished cell 34. The cells 34 are pressure tested to insure quality welds and components prior to being assembled into the core 22.

As best shown in FIG. 4, each of the individual sheets 100 have a plurality of corners designated by a, b, c, d, e and f. The corners of the sheets 100 have corresponding corners a, b, c, d, e, and f for each of the cells 34. The corresponding corners of each cell 34 are aligned, stacked in contact with another one of the cells 34 and placed in side-by-side contacting relationship to the corresponding wing portions 106 and 108. As best shown in FIGS. 2 and 6, the stacked cells 34 are secured by the securing means 40 which includes a plurality of circumferential welds 170 along a portion of their edges to secure the cells 34 in the stacked circular array. Each of the plurality of corners of the cells 34 are welded together.

In this specific application, a portion of the circumferential welds 170 is used to weld each of the corners a, b, c, d, e and f. The inner portion 28 of the core 22 has a preestablished circumference and the outer portion 30 of the core 22 has a preestablished circumference. The preestablished circumference of the inner portion 28 of the core 22 is made up of a plurality of linear distances "D1". Each of the distances "D1" is measured from respective sides of each sheet 100 at the inner portion 28 of the core 22. Due to the involute shape of the cells 34, a distance "D2" being greater than the distance "D1" is measured from respective sides of each sheet 100 at the outer portion 30 of the core 22. The combination or addition of the distances "D1" results in the preestablished circumference of the inner portion 28 and the combination or addition of the distance "D2" results in the preestablished circumference of the outer portion 30 of the core 22.

As best shown in FIGS. 1 and 2, a further portion of the means 78 for resisting the forces attempting to separate the cells 34 and the passage 46,38,48 therebetween includes a plurality of evenly spaced individual tension rings 180 positioned around the outer portion 30 of the core 22 and a plurality of welds 182 circumferentially connecting aligned spacer bars 138 at the inner portion 28 of the core 22. The plurality of tension rings 180 have a rate of expansion and contraction which is substantially equal to the expansion rate of the core 22. The plurality of circumferential welds 182 and the spacers 138 form a plurality of compressive hoops 184. The hoops 184 are circumferentially aligned with the spacers 138 and thus being evenly spaced along the core 22 and enable each of the cells 34 to be in force transferring relationship to each other.

As best shown in FIG. 2, a portion of the means 80 for sealing includes a manifold 188 which is positioned between the cooler recipient fluid 16 prior to entering the core 22 and the heated recipient fluid 16 after exiting the core 22. An apparatus 190 for surrounding the recipient fluid 16 is also included and has an inner portion 192 and an outer portion 194 which act as a biasing means 196 for holding one end of the core 22 in contact with the end plate 68 of the housing 64.

As best shown in FIG. 2, the means 80 for sealing further has a portion thereof adapted to seal the exhaust system 18 so that the donor fluid 20 passes through the core 22.

Industrial Applicability

The compressor section of the conventional gas turbine engine 12 compresses atmospheric air or recipient fluid 16 which is then passed through the inlet passage 42, heat recipient passages 38 and outlet passage 44 of the heat exchanger 10. Exhaust gases or donor fluid 20 from the combustion in the engine 12 pass through the inlet passage 46, heat donor passages 38 and outlet passage 48 of the heat exchanger 10 and thermally heat the recipient fluid 16 in the heat exchanger 10 prior to reentering the engine 12. The recipient fluid is then mixed with fuel in the combustion chamber, combusted and exhausted as the donor fluid 20. Thus, during operation of the engine 12 a continuous cycle occurs, to entering the core 22 and the heated recipient fluid 16 after exiting the core 22.

Especially when the engine 12 is used in fluctuating loads, such as vehicular or marine applications, the cyclic operation of the engine 12 causes the exhaust gas temperature to increase and decrease. Furthermore, the intake air and the exhaust gas volume and pressure vary depending on the the cyclic operation. Thus, the structural integrity of the heat exchanger components are stressed to the ultimate.

Functionally the heat transfer is best accomplished as follows. The short flow of the recipient fluid 16 passes through the triangular member 140 along the shorter length of the side 144, through the shorter length of the corrugated primary surface center portion 104, along the shorter length of the side 144 and into the circular reservoir 88. The longer flow of the recipient fluid 16 passes along the longer length of the side 144, through the longer length of the corrugated primary surface center portion 104 and along the longer length of the side 144 and into the circular reservoir 88. The longer flow of the donor fluid 20 passes through the triangular member 150 closest to the longer end 152, through the shorter length of the corrugated primary surface center portion 104 and through the triangular member 150 closest to the longer end 152. The shorter flow of the donor fluid 20 passes through the triangular member 150 closest to the shorter end 157, through the longer length of the corrugated primary surface center portion 104 and through the triangular member 150 closest to the shorter end 157. Thus, the hotter fluid remains in heat transferring relationship with the sheet 100 for a shorter time than does the cooler fluid resulting in a uniform heating of the heat recipient fluid 16.

The uniform cross-sectional area and the preestablished thickness lends itself to the manufacturability of a primary surface heat exchanger. It is much simpler to form each pleat with a uniform thickness verses a pleat having a different thickness at one end verses the other end. For example, the die used to form a non-uniform thickness of a pleat would have one end with a deeper draw than the other end. Thus, the material feed and the wear rate of the die would cause manufacturing problems. The manufacturability of the spacer means 102 is also enhanced with a uniform cross-sectional area throughout the entire length of the passages 42,36,44 and 46,38,48 since the spacer has a preestablished uniform thickness. The cost and serviceability can be greatly reduced and the manufacturability greatly increased by using a uniform constant thickness. Furthermore, in circular heat exchangers wherein the donor fluid 20 passes from the inner portion 28 to the outer portion 30, a non-uniform cross-sectional area throughout the entire length of the passage could be desirable. But, it is desirable to have the inlet portion larger than the outlet portion since the donor fluid cools as it passes from the inner portion 28 to the outer portion 30 and the volume is reduced and the density is increased. With the circumference of the inner portion 28 being smaller than the circumference of the outer portion 30 it is very difficult if not impossible to successfully have such a desired design. With the involute construction of the cells 34, a plurality of passages 42,36,44 and 46,38,48 can have a uniform cross-sectional area throughout the entire passages 42,36,44 and 46,38,48 which is efficiently better than having a smaller inlet verses a larger outlet. It has been further theorized that: the donor fluid loses its higher heat value as it first enters the core 22, and in order to progressively transfer more of the heat from the donor fluid 20, the donor fluid needs to be retained in the core 22 for a longer period of time as it becomes cooler. Thus, the uniform cross-sectional area through the entire length of the passages will functionally be more efficient than existing circular heat exchangers. And since the recipient fluid 16 is directed in a counter flow direction, from the outer portion 30 towards the inner portion 28, a greater amount of heat can be transferred from the donor fluid 20 to the recipient fluid 16. The cooler donor fluid 20 near the outer portion 30 of the core 22 heats the cooler recipient fluid 16 and the hotter donor fluid 20 near the inner portion 28 further heats the preheated recipient fluid 16 near the inner portion 28 of the core 22. Thus, a greater amount of heat transfer is achieved with the present circular heat exchanger.

Other aspects, objects and advantages of this invention can be obtained from a study of the drawings, the disclosure and the appended claims.

I claim:

1. A heat exchanger comprising a core having a plurality of heat recipient passages and a plurality of heat donor passages therein, the heat recipient passages having a recipient fluid therein during operation and the heat donor passages having a donor fluid therein during operation, further comprising:

said core including a plurality of stacked primary surface cells each defining one of the passages therein, the cells being secured together forming a generally circular core, adjacent cells forming the other of the passages therebetween;

each of said plurality of cells having an involute curved shape and including at least a pair of primary surface pleated sheets, each of said primary surface pleated sheets having a center portion defining a generally trapezoidal shape;

each of said heat recipient passages having a uniform cross-sectional area throughout the entire length of the passage; and each of said heat donor passages having a uniform cross-sectional area throughout the entire length of the passage.

2. The heat exchanger of claim 1 wherein said trapezoidal shape includes a pair of parallel ends and a pair of sides.

3. The heat exchanger of claim 1 wherein said primary surface pleated sheets further include a plurality of wing portions attached to each of the primary surface pleated sheets.

4. The heat exchanger of claim 3 wherein said wing portions have a generally trapezoidal shape.

5. The heat exchanger of claim 3 wherein each of said wing portions define one of an inlet passage and an outlet passage therebetween, and said passages having a uniform cross-sectional area throughout the entire length of the passage.

6. The heat exchanger of claim 5 wherein said uniform cross-sectional area throughout the entire length of the inlet passages and the outlet passages are equal to the uniform cross-sectional area throughout the entire length of one of the heat recipient passages and the heat donor passages.

7. The heat exchanger of claim 6 wherein said uniform cross-sectional area throughout the entire length of the inlet passages and the outlet passages are equal to the uniform cross-sectional area throughout the entire length of the heat recipient passages and the heat donor passages.

8. A gas turbine engine including a compressor section being in fluid connection with a combustor further being in fluid connection with a power turbine, an exhaust system having a donor fluid passing therethrough after exiting from the combustor and passing through the power turbine, an air intake system having a recipient fluid passing therethrough after exiting from the compressor, a heat exchanger disposed in fluid communication with the exhaust system and the air intake system and including a core having a plurality of heat recipient passages, through which the recipient fluid passes, and a plurality of heat donor passages, through which the donor fluid passes therein and a housing surrounding the core, said heat exchanger further comprising:

said core including a plurality of stacked primary surface cells each defining one of the passages therein, the cells being secured together forming a generally circular core, adjacent cells forming the other of the passages therebetween;

each of said plurality of cells having an involute curved shape and including at least a pair of primary surface pleated sheets, each of said primary surface pleated sheets having a center portion defining a generally trapezoidal shape;

each of said heat recipient passages having a uniform cross-sectional area throughout the entire length of the passage; and each of said heat donor passages having a uniform cross-sectional area throughout the entire length of the passage.

9. The gas turbine engine of claim 8 wherein said trapezoidal shape includes a pair of parallel ends and a pair of sides.

10. The gas turbine engine of claim 1 wherein said primary surface pleated sheets further include a plurality of wing portions attached to each of the primary surface pleated sheets.

11. The gas turbine engine of claim 10 wherein said wing portions have a generally trapezoidal shape.

12. The gas turbine engine of claim 10 wherein each of said wing portions define one of an inlet passage and an outlet passage therebetween, and said passages having a uniform cross-sectional area throughout the entire length of the passages.

13. The gas turbine engine of claim 12 wherein said uniform cross-sectional area throughout the entire length of the inlet passages and the outlet passages are equal to the uniform cross-sectional area throughout the entire length of one of the heat recipient passages and the heat donor passages.

14. The gas turbine engine of claim 12 wherein said uniform cross-sectional area throughout the entire length of the inlet passages and the outlet passages are equal to the uniform cross-sectional area throughout the entire length of the heat recipient passages and the heat donor passages.

* * * * *